(12) United States Patent
Chang

(10) Patent No.: US 9,060,643 B2
(45) Date of Patent: Jun. 23, 2015

(54) EXTRACTION DEVICE FOR IMMERSION BEVERAGE PRIMARY LIQUID

(76) Inventor: Ying-Yen Chang, Changhua (TW)

(*) Notice: Subject to any disclaimer, the term of this patent is extended or adjusted under 35 U.S.C. 154(b) by 807 days.

(21) Appl. No.: 13/368,411

(22) Filed: Feb. 8, 2012

(65) Prior Publication Data

US 2012/0204729 A1    Aug. 16, 2012

(30) Foreign Application Priority Data

Feb. 10, 2011    (TW) .............................. 100202605 U

(51) Int. Cl.
*A47J 31/44* (2006.01)
*A47J 31/20* (2006.01)

(52) U.S. Cl.
CPC ....................................... *A47J 31/20* (2013.01)

(58) Field of Classification Search
USPC ............ 99/295, 279, 306, 317; 210/232, 474, 210/479, 481
See application file for complete search history.

(56) References Cited

U.S. PATENT DOCUMENTS

| | | | | |
|---|---|---|---|---|
| 1,111,249 A | * | 9/1914 | Courtwright | 210/474 |
| 2,496,757 A | * | 2/1950 | Sieling | 210/474 |
| 4,271,024 A | * | 6/1981 | Kawolics et al. | 210/474 |
| 4,765,896 A | * | 8/1988 | Hartley et al. | 210/474 |
| 5,064,533 A | * | 11/1991 | Anson | 210/232 |
| 5,176,830 A | * | 1/1993 | Wiggins | 210/477 |
| D543,328 S | * | 5/2007 | Kulkey | D34/6 |
| 2009/0056557 A1 | * | 3/2009 | Lin | 99/323 |

* cited by examiner

*Primary Examiner* — Jianying Atkisson
(74) *Attorney, Agent, or Firm* — Jackson IPG PLLC; Demian K. Jackson

(57) ABSTRACT

An extraction device is disclosed, mainly including a frame, an elastic fixing ring and a filter. The frame includes a circular opening frame and a lower section formed with a hollowed cup-shaped structure. The filter includes a top section outwardly clamped by the elastic fixing ring to be positioned and clamped outside the filtration stand. The filtration stand includes a downward-bent handle outwardly extended from the frame, and the bottom end of the handle is disposed with an inwardly-bent concave hanging opening, thereby forming a filter stand with a cup-shaped liquid-filtering area. When the filter stand is lifted to be held above a cup opening of the liquid-collecting cup or to be stayed above the liquid-collecting cup, the primary liquid is drained out to downwardly or outwardly flow through the filter to rapidly drop in the liquid-collecting cup, and the residue can be collected in the filter.

7 Claims, 5 Drawing Sheets

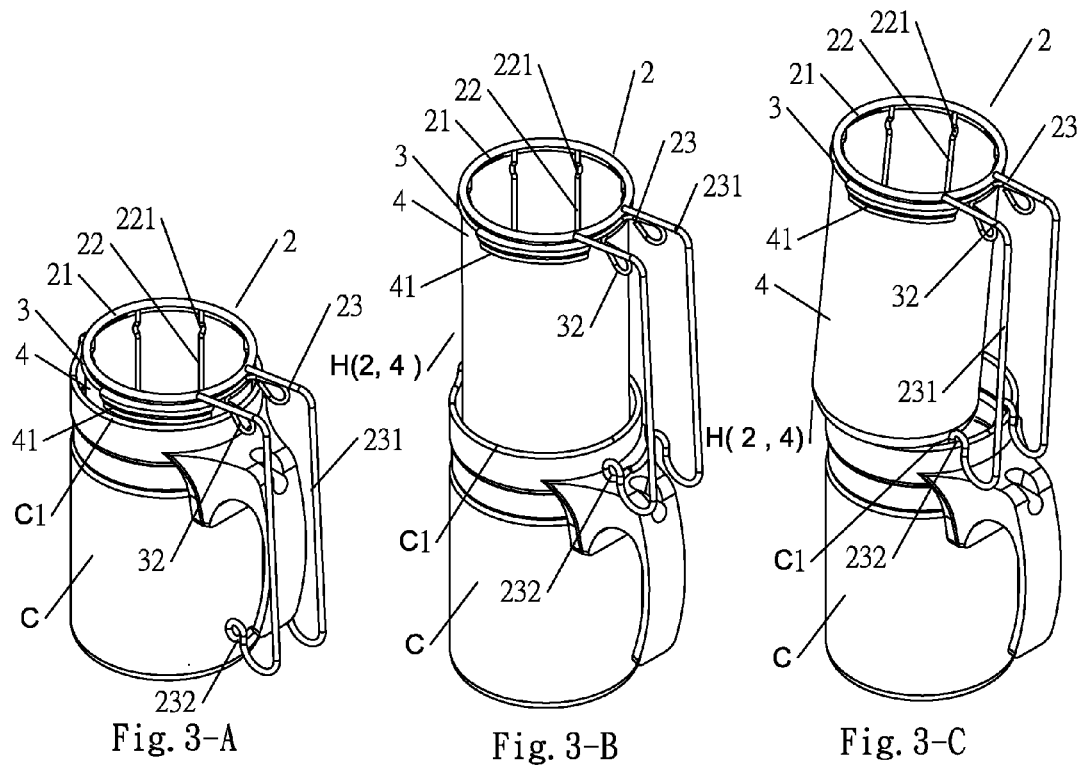
Fig. 3-A    Fig. 3-B    Fig. 3-C
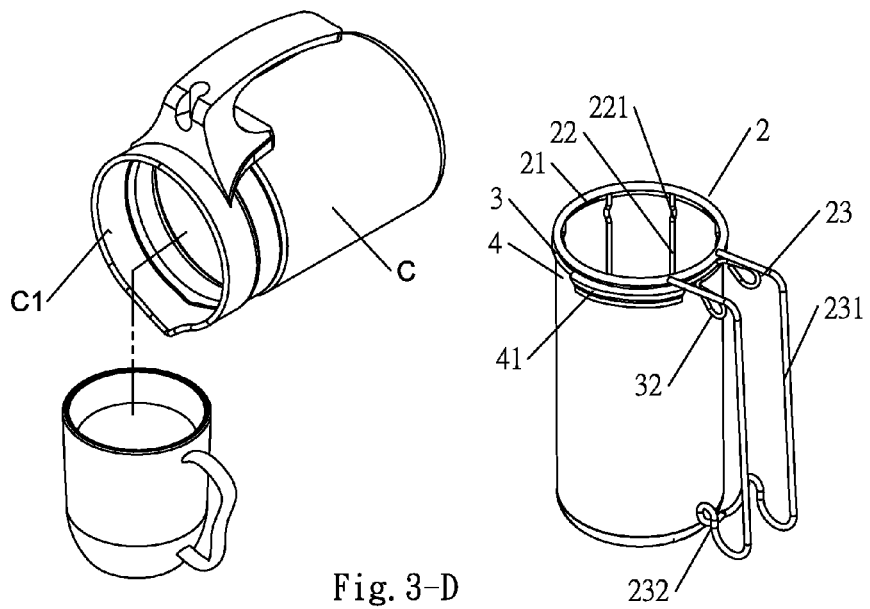
Fig. 3-D

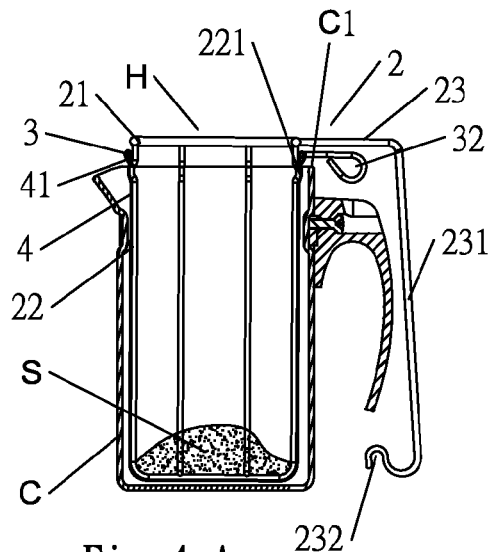
Fig. 4-A
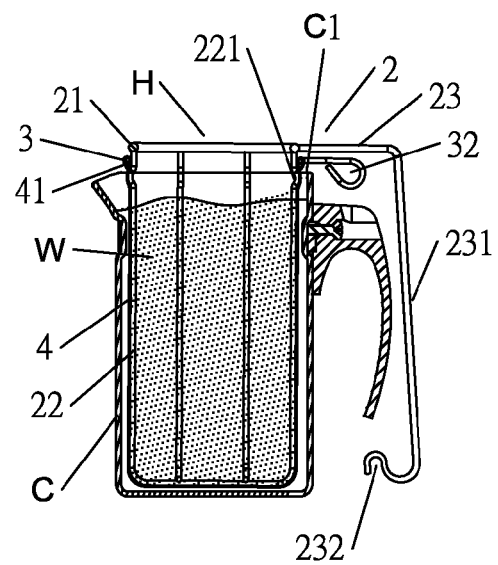
Fig. 4-B
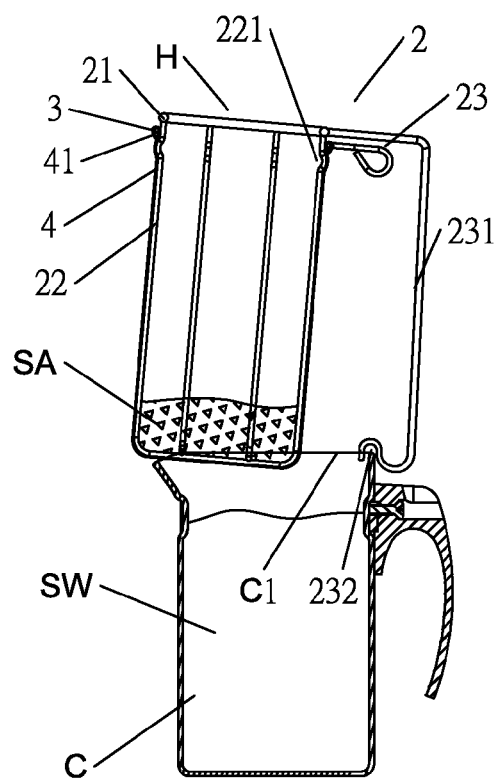
Fig. 4-C

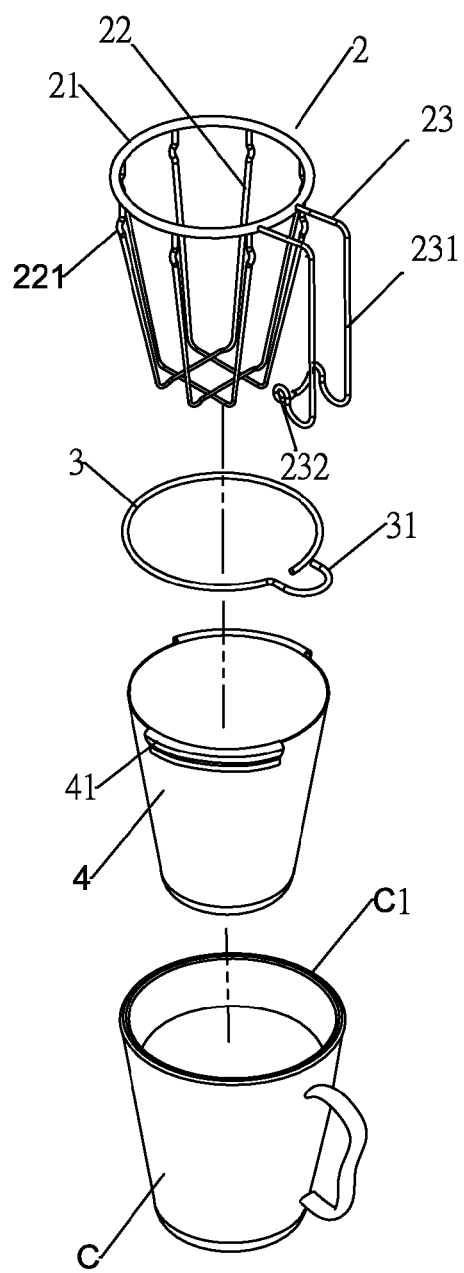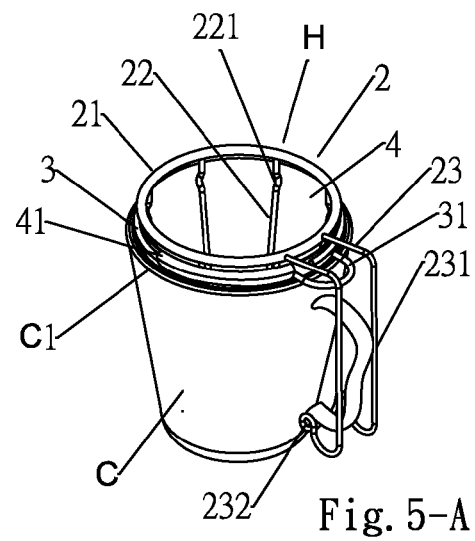
Fig. 5-A
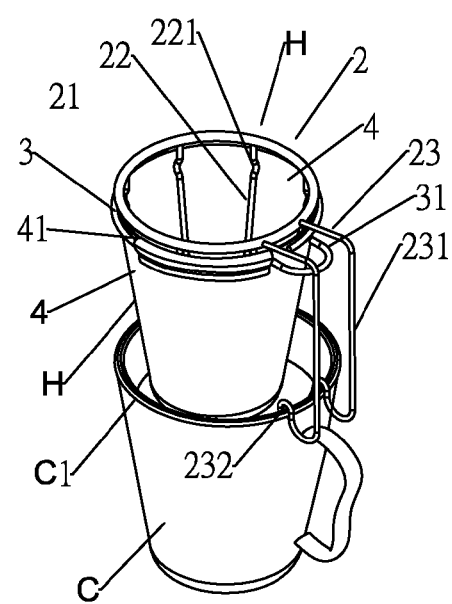
Fig. 5-B
Fig. 5

EXTRACTION DEVICE FOR IMMERSION BEVERAGE PRIMARY LIQUID

BACKGROUND OF THE INVENTION

1. Field of the Invention

The present invention relates to an extraction device for an immersion beverage primary liquid capable of improving manual filtrating and brewing processes of beverages such as coffee, leaf tea or flower tea. The extraction device mainly includes a cup-shaped frame and a filter. The frame includes a lower section circumferentially engaged with the detachable filter which has the same type as the frame. The frame includes a downward-bent and outwardly-extended handle, and the bottom end of the handle is disposed with an inwardly-bent concave hanging opening which has a downwardly-faced distal end, thereby forming a filter stand. The filter stand is configured to enter into a selected liquid-collecting cup. When the filter stand is engaged into the liquid-collecting cup and coffee powder or tea leaves is disposed in a bottom section of the filtration stand, an adequate amount of hot water is directly poured into the filter stand for extraction. The lifted filter stand can be raised and positioned by directly riding a hanging opening thereof hanged on any places of a rim of the liquid-collecting cup, and the drained primary liquid flows through the filter to drop in the liquid-collecting cup, without using an user's hand to hold the filter stand.

2. Description of the Related Art

In general, a primary liquid of coffee or other beverages such as leaf tea and flower tea is mainly brewed by a particular machine and manual brewing process. Due to the factors such as high cost, large volume and professional operation, the particular machine is mainly designed for business use and not suitable for individual or small entity.

In view of this, different manual brewing devices and cooking devices are provided and also commonly used for making beverages. The brewing device or the cooking device mainly includes an immersing or filtering-immersing container, a primary liquid dispensing container and a residue-filtering device. For example, it is representative of Siphon coffee kettle, French press, Japan drenching and soaking kettle, Vietnam coffee filtering cup, and a brewing kettle assembled by an inner cup and an outer cup which has been widely used in recent years. However, although the disclosed devices have different structures therebetween, these devices basically have the same basic operation including the steps of: using hot water to immersedly contact or pass through the materials such as coffee power, tea leaves, petals of flower tea to extract a primary liquid therefrom, and collecting the primary liquid in a particular container for direct drinking use, or filtering the collected primary liquid for drinking use.

In Siphon coffee kettle, due to a feeding water required to be directly cooked for the preparation of beverage, it is appreciated that the Siphon coffee kettle has complicated structure, carrying inconveniences and operational difficulties. In the operations of other manual brewing devices for primary liquid extraction, it is convenient that the hot water can be directly used for brewing the beverage, but the allowable filtering area (slightly smaller than the inner diameter of the cup opening) of the filtering cloth or paper for residue filtration is small and the filtering operation thereof is concentrated on a specific region at the middle end, resulting in low extraction speed of the primary liquid, jams on the meshes of the filtering fabric caused by passed residues accumulated in the lower filtration layer, and slowness or disablement of liquid-discharging velocity at the subsequent liquid-discharging processes. Further, due to the long immersing time and inaccuracy for controlling immersing or filtering time, the quality of the extracted primary liquid is thus decreased.

For solving the defects to the above-described filtering and brewing qualities in the manual brewing devices, Japan drenching and soaking kettle with a disposable hopper-type filtering bag is therefore provided. However, it is not economic and environmentally protective by using the disposable bag at each filtration process. Furthermore, individual preparations for dedicated filtration stand/liquid-collecting cup and cups will result in the problems such as large volume, loosening structure, and carrying inconveniences.

In recent years, hanger-type brewing bags can be foldably flatted with smallest volume and carrying convenience, but it is equally not economic and environmentally protective by using the disposable bag. In particular, when the hanger-type brewing bag is used, a user must hold and lift the brewing bag above the cup opening to wait for the extracted primary liquid to be almost drained out, resulting in operational inconveniences and low practicability.

BRIEF SUMMARY OF THE INVENTION

In view of this, the main purpose of the present invention is to provide an extraction device for an immersion beverage primary liquid with rapid and convenient operation processes. A food material is directly disposed on a cup-shaped filtration stand provided with largest liquid-filtering area. A selected liquid-collecting cup has an inner size slightly greater than that of the filtration stand. When the food material is infiltrated and immersed in a sufficient hot water, the primary liquid is drained out to downwardly or outwardly flow through the filter to rapidly drop in the liquid-collecting cup when the filtration stand is lifted, and the residue of the food material is relatively filtered to concentrate on the filter, thereby attaining precise controlling of immersing time and rapid finish of filtration liquid under simple operations.

Another purpose of the present invention is to provide an extraction device for an immersion beverage primary liquid suitable for individual use, incorporated with an individual cup and a small-sized cup-shaped filtration stand. When the cup-shaped filtration stand is removed, a primary liquid can be directly dripped into the individual cup for direct drinking use.

Another purpose of the present invention is to provide an extraction device for an immersion beverage primary liquid with an extremely simplified operational structure. A filtration stand includes a bent handle outwardly extended from a side surface thereof, and a bottom end of the handle is disposed with an inwardly-bent concave hanging opening which has a downwardly-faced distal end. When the filter stand is lifted via the handle, the lifted filter stand can be raised and positioned by directly riding a hanging opening thereof hanged on any places of a rim of the liquid-collecting cup, and the drained primary liquid flows through the filter to be conveniently collected in the liquid-collecting cup.

Another purpose of the present invention is to provide an extraction device for an immersion beverage primary liquid, capable of being conveniently engaged/rejected and cleaned. A filtration stand comprises a lower section disposed with a hollowed frame-type internal frame, incorporated with a filter engaged outside the frame-type internal frame to form a cup-shaped filtration stand. In the brewing process of the food material, due to the filter temporarily positioned outside the frame-type internal frame by an elastic fixing ring, the filter can be conveniently upwardly engaged to or downwardly rejected from the internal frame, so that the frame-type internal frame can be directly cleaned by water. Further, due to the fabric filter capable of being conveniently separated from the frame-type internal frame for cleaning and drying in the air or the sun, it is environmentally protective and convenient for cleaning to reuse the filter with excellent hygienic effect.

Yet another purpose of the present invention is to provide an extraction device for an immersion beverage primary liquid, capable of offering a filter made of cheap paper or disposable non-woven fabric. The disposable filter is capable of being snuggly engaged on or released from the outside of a top section of a frame by an elastic fixing ring, i.e., the filter can be fixedly engaged to the frame or downwardly removed from the frame for discarding, thereby obtaining free of cleaning and excellent hygiene. Further, it is environmentally protective, cost-effective and practicably convenient to reproduce the removed filter contained with filtered coffee residue into a dryer and a deodorant bag, after the removed filter is dried and sealed.

Still another purpose of the present invention is to provide an extraction device for an immersion beverage primary liquid with an extremely small volume. It is particular to provide a cup-type engagement by assembling a liquid-collecting cup or an individual cup to a filtration stand to substantially form as a single-piece volume. Further, the inner space of the cup-shaped filtration stand is allowed to receive and carry the food material therein, thereby providing excellent portability and practicability.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1-A is a perspective exploded view of a primary liquid extraction device of the present invention;

FIG. 2-A is a perspective assembled schematic view of a filter and an elastic fixing ring;

FIGS. 3-A, 3-B, 3-C and 3-D are perspective schematic views showing the continuous operation of the present invention;

FIGS. 4-A, 4-B and 4-C are sectional schematic views showing the continuous operation of the present invention;

FIG. 5 is a perspective exploded view of a primary liquid extraction device of another embodiment of the present invention; and FIGS. 5-A and 5B are perspective schematic views showing the application of another embodiment of the present invention.

DETAILED DESCRIPTION OF THE INVENTION

Figure 1:
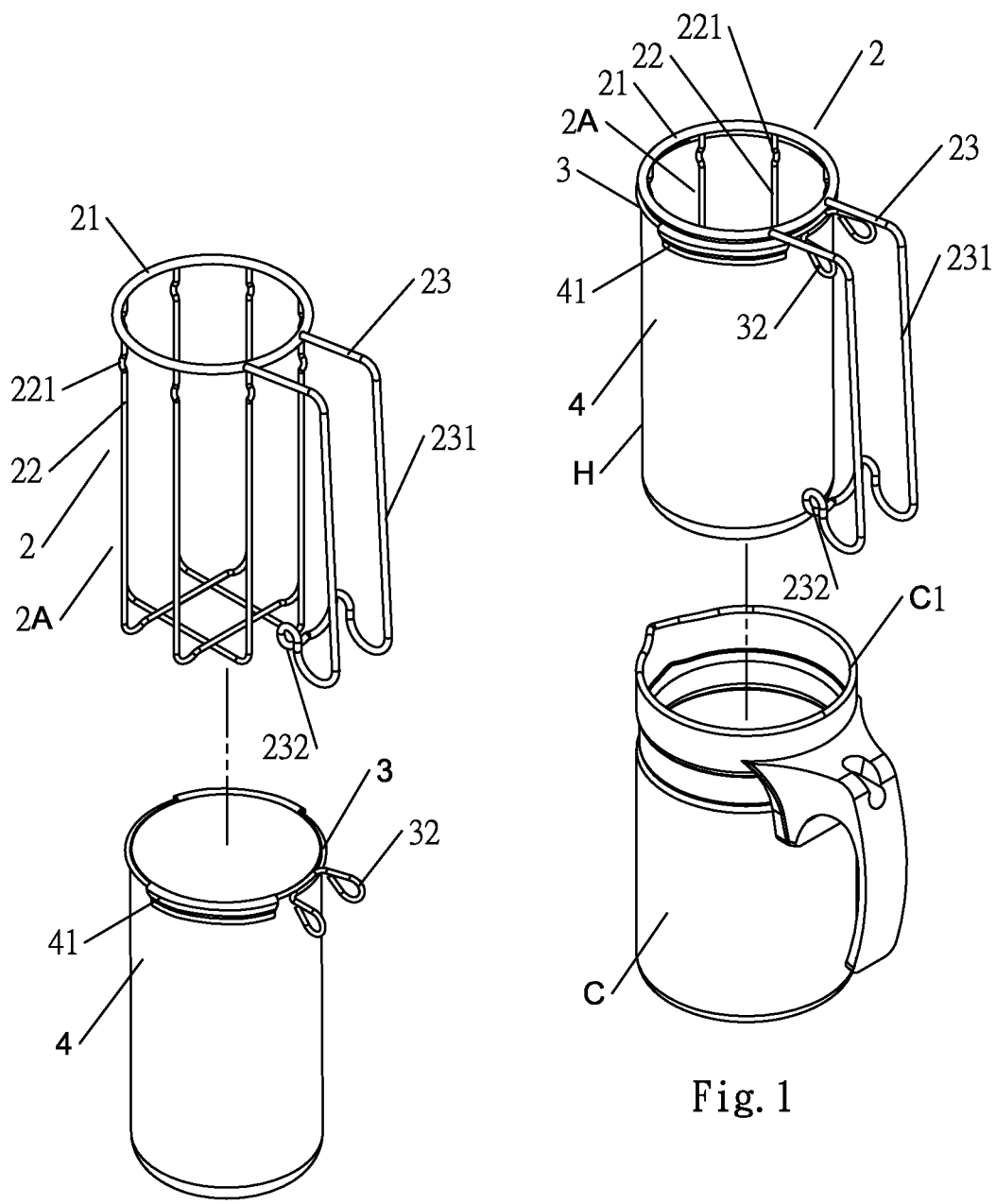
FIG. 1 is a perspective assembled view of a primary liquid extraction device of the present invention.

Referring to FIGS. 1 and 1-A, an extraction device of the present invention for an immersion beverage primary liquid is allowed to be vertically downwardly entered and engaged in or to be upwardly rejected from a liquid-collecting cup 'C' which is selected from a type of inner-section cup.

The extraction device of the present invention mainly comprises a filtration stand 2, an elastic fixing ring 3 and a filter 4.

The filtration stand 2 comprises an upper section disposed with a circular opening frame 21 and a lower section disposed with a plurality of folded-type bars 22 separately mounted to the circular opening frame 21 to form a cup-shaped frame 2A with a hollowed circumferential surface and a hollowed bottom surface, wherein a plurality of outwardly-faced positioning convex points 221 of being arranged at same horizontal level are respectively provided on top sections of the circumferentially-arranged folded-type bars 22. The filtration stand 2 is vertically downwardly entered and engaged in or being upwardly rejected from the liquid-collecting cup 'C'. In this embodiment, the filtration stand 2 is formed by a straight-shaped cup corresponding to the inner shape of the liquid-collecting cup 'C', and the size of the filtration stand 2 is slightly less than that of the inner shape of the liquid-collecting cup 'C'. In other embodiment, the filtration stand 2 can be formed by type of an inversely-tapered stand body with a wide top portion and a narrow bottom portion corresponding to the inner shape of the liquid-collecting cup 'C' (see FIG. 5).

For providing a convenient operation by a user's hand, the filtration stand 2 further comprises a handle 23 outwardly extended from one side of the circular opening frame 21 disposed on the upper section thereof, so that the user can conveniently move the filtration stand 2. For the user to conveniently hold the handle 23 without slipping, the handle 23 of the filtration stand 2 comprises an external section disposed with a downward-bent holding portion 231. The holding portion 231 of the handle 23 includes a bottom end having a lowest position which is not to exceed a lowest position of the filtration stand 2, thereby obtaining a balance effect when the filtration stand 2 is placed on a desk (as shown in FIG. 3-D). The holding portion 231 of the handle 23 is capable of directly riding above a side grip portion of the liquid-collecting cup 'C'. When a bottom section of the filtration stand 2 is disposed in a top section of the liquid-collecting cup 'C', incorporated with a side surface of the bottom section of the filtration stand 2 riding on a corresponding side surface of a rim C1 of the liquid-collecting cup 'C' or riding above the rim C1 of the liquid-collecting cup 'C', the filtration stand 2 can be positioned on the cup opening of the liquid-collecting cup 'C' to form a positioning arrangement therebetween (as shown in FIG. 3-B), thereby providing a simple operation mode. Further, the bottom end of the holding portion 231 of the handle 23 of the filtration stand 2 is disposed with an inwardly-bent concave hanging opening 232 which has a downwardly-faced distal end and an opening size slightly greater than a thickness of a cup wall of the cup opening of the liquid-collecting cup 'C'. When the bottom section of the filtration stand 2 is disposed in the top section of the liquid-collecting cup 'C', the hanging opening 232 of the filtration stand 2 is capable of hanging on the rim C1 of the cup opening of the liquid-collecting cup 'C', incorporated with the side surface of the bottom section of the filtration stand 2 riding on the corresponding side surface of the rim C1 of the liquid-collecting cup 'C' or riding above the rim C1 of the liquid-collecting cup 'C', the filtration stand 2 can also be positioned on the cup opening of the liquid-collecting cup 'C' to form a positioning arrangement therebetween (as shown in FIG. 3-C), thereby providing another simple operation mode.

In this embodiment, the filtration stand 2 is preferably welded by fine stainless wires suitable for being immersed in a hot liquid. Alternatively, the filtration stand 2 can be made by heat durable plastic injection molding.

Figure 2:
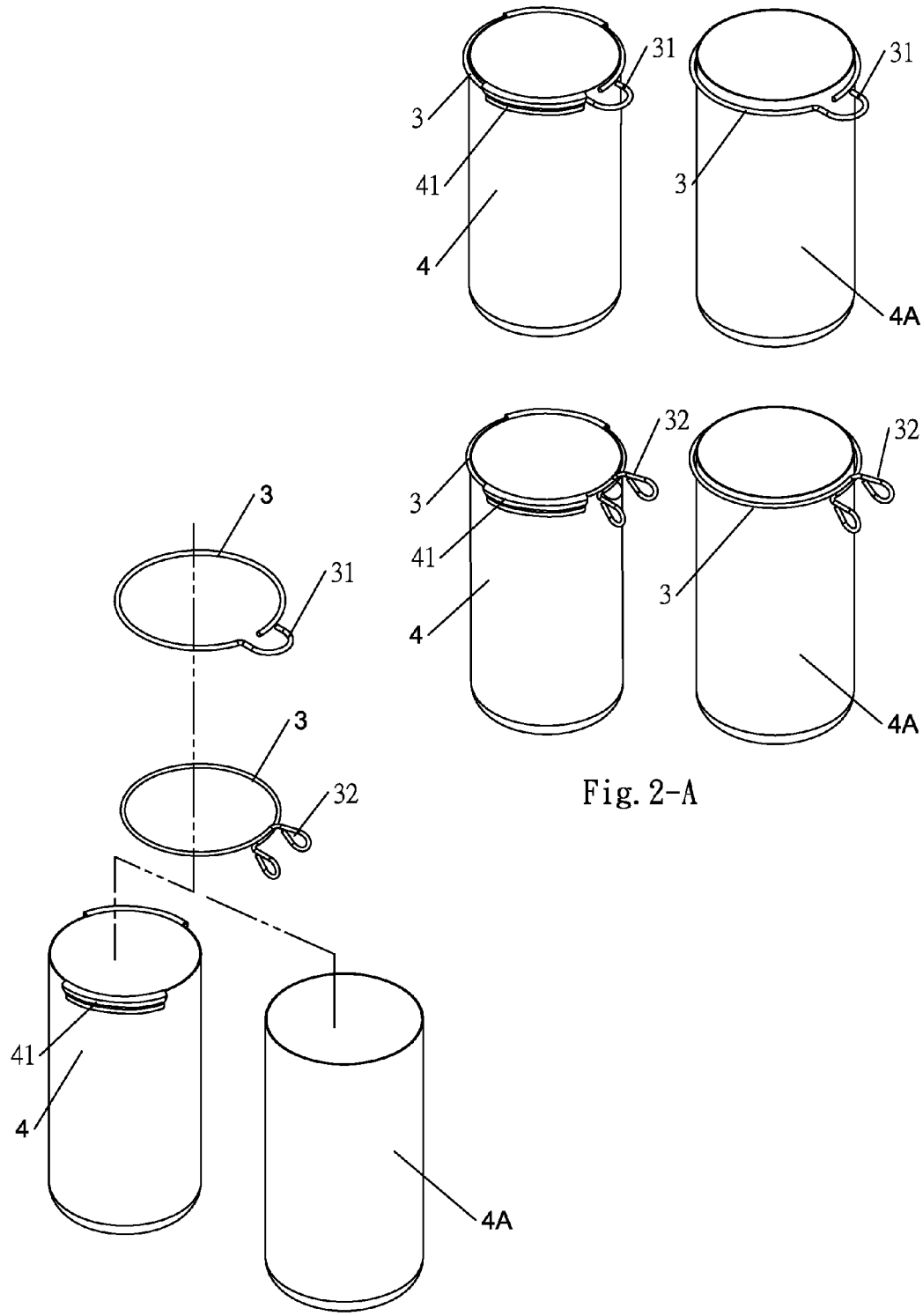
FIG. 2 is a perspective exploded schematic view of a filter and an elastic fixing ring.

Referring also to FIGS. 2 and 2-A, the elastic fixing ring 3 formed of non-closed-ended type comprises a ring body formed with an elastic ring opening and capable of being bottom-up fitted to and elastically engaged and fastened outside a top section of the filtration stand 2. When extending the elastic fixing ring 3 to upwardly pass through the positioning convex points 221 of the circumferentially-arranged folded-type bars 22 located at the top section of the filtration stand 2, the elastic fixing ring 3 can be elastically rebounded to position above the positioning convex points 221 of the circumferentially-arranged folded-type bars 22 to stop the elastic fixing ring 3 from being downwardly slid. In this embodiment, the elastic fixing ring 3 is preferably wound by fine stainless wires. Alternatively, the elastic fixing ring 3 can be made by heat durable plastic injection molding. With the expandable property of the elastic ring opening of the elastic fixing ring 3, one segment of the ring body of the elastic fixing ring 3 can be provided with a shank portion 31 which is configured with a outwardly-detoured and backwardly-turned profile, so that the user's hand can directly hold the shank portion 31 to move the elastic fixing ring 3 outside the filtration stand 2 to be upwardly engaged or downwardly rejected. Further, the ring body of the elastic fixing ring 3 comprises two distal segments which are capable of being formed with extended segments and locally overlapped and being bent as pinching portions 32, and the user's two fingers can squeeze the pinching portions 32 of the elastic fixing ring 3 to expand the elastic ring opening thereof, so that the elastic fixing ring 3 can be moved outside the filtration stand 2 to be upwardly engaged or downwardly rejected.

The filter 4, made of a thin material (e.g., woven or non-woven fabrics, papers, etc.,) provided with high-density meshes and tiny residue filtration effect and shaped as a cup type formed by cutting and sewing or folding to be configured to adaptively engage outside the filtration stand 2 in loose-fit, comprises a top section outwardly clamped by the elastic fixing ring 3 to be positioned and clamped outside the filtration stand 2, thereby constituting a cup-shaped filter stand 'H' of large-sized liquid-filtering area provided by the whole surface of the filter 4. In this embodiment, the filter 4 is preferably made of high temperature resistant fibrous fabrics suitable for being immersed in a hot liquid. In FIG. 2-A, the filter 4 made of fabric is classified into an environmental type capable of being rewashed and reused, and the filter 4A made of non-woven fabric or paper material by simplified manufacturing method and low cost is classified into a disposable type capable of being used once. For matching the shape of the filtration stand 2 and being arranged at larger size, the filter 4 is formed by a straight-shaped type and an inversely-tapered type with a wide top portion and a narrow bottom portion (see FIG. 5).

In particular, partial segments (e.g., extra fabric part to be reserved) of a top side of a port of the filter 4 are provided with two or more segmental external hangers 41 by machine sewing after being bent, each of the hangers 41 has an inside hanging hole for continuous penetration of ring segments of the elastic fixing ring 3 to form the top section of the filter 4 circumferentially penetrated and engaged with the elastic fixing ring 3 so that the filter 4 and the elastic fixing ring 3 can be integrally combined in advance, and therefore the user can directly hold the elastic fixing ring 3 integrally combined with the filter 4 to be engaged in the filtration stand 2, thereby assembling the filtration stand 2 and the filter 4 into the cup-shaped filter stand 'H'.

With the above-described structures, the cup-shaped filter stand 'H' engaged in the liquid-collecting cup 'C' can be ready for beverage preparation in accordance with the following reference steps of operation procedure.

In first step, the food material 'S' such as grinded coffee powder or tea leaves, or the selected particles with a predetermined amount is directly poured into the cup-shaped filter stand 'H' (as shown in FIGS. 3-A and 4-A).

In second step, an adequate amount of hot water 'W' with suitable temperature is directly poured into the cup-shaped filter stand 'H'. The hot water 'W' is gradually filled up in the liquid-collecting cup 'C' when passing through the filtration stand 2 and the filter 4, and the level of the hot water 'W' in the liquid-collecting cup 'C' is preferably not over the highest position of the filter 4 (as shown in FIG. 4-B).

In third step, when being infiltrated and immersed in the sufficient hot water 'W', the food material 'S' in the cup-shaped filter stand 'H' begins to extract a primary liquid SW to be filled up the cup-shaped filter stand 'H' and gradually mixed with the hot water 'W' located outside the filter 4.

In fourth step, an optimistic extraction time of the food material 'S' is set according to the property thereof, or degree of extraction of the food material 'S' can be determined according to the tint of the hot water 'W' located outside the filter 4 converting into the primary liquid SW.

In fifth step, after finishing the extraction process of the primary liquid SW of the food material 'S', the cup-shaped filter stand 'H' is vertically lifted through the handle 23 of the filtration stand 2. When lifting the cup-shaped filter stand 'H', under the gravity effect, the majority of the primary liquid SW originally accommodated in the cup-shaped filter stand 'H' separatively flows toward and through the inner circumferential surface of the circumferentially-arranged filter 4 which has the large-sized liquid-filtering area to filter off the residue SA therein, and then the filtered primary liquid SW is rapidly dropped in the liquid-collecting cup 'C'. The minority of the primary liquid SW of the food material 'S' and the main residue SA are dropped into and concentrated to the bottom surface of the filtration stand 2 and the filter 4 (as shown in FIG. 3-B).

In sixth step, when the user hold the cup-shaped filter stand 'H' at a certain vertical height above the cup opening of the liquid-collecting cup 'C', or when the cup-shaped filter stand 'H' is kept to stay above the liquid-collecting cup 'C' via other auxiliary positioning devices, the residual primary liquid SW together with the main residue SA is continuously drained out to flow through the bottom section and the sides of the filter 4 or vertically flow through the residue SA and the bottom surface of the filter 4, so that the residue SA fully extracted is piled up on the bottom of the filter 4 and the primary liquid SW is collected in the liquid-collecting cup 'C'. Further, the user can utilize the holding portion 231 of the handle 23 of the filtration stand 2 to ride above the side grip portion of the liquid-collecting cup 'C', or the hanging opening 232 of the filtration stand 2 can be hanged on the rim C1 of the cup opening of the liquid-collecting cup 'C', i.e., the filtration stand 2 is positioned on the cup opening of the liquid-collecting cup 'C', so that the extraction of the primary liquid SW can be fulfilled by fully extracting the residue SA, without holding the filtration stand 2 (as shown in FIGS. 3-C and 4-C).

In seventh step, when removing the filtration stand 2 from the liquid-collecting cup 'C', the primary liquid SW received in the liquid-collecting cup 'C' is prepared for drinking use. As shown in FIG. 3-D, when the filtration stand 2 and the filter 4 are incorporated with a large-volume liquid-collecting cup 'C', the large-volume liquid-collecting cup 'C' can be operated like a kettle to dispense the primary liquid SW to individual cup-like container for drinking use. As shown in FIG. 5, when the filtration stand 2 and the filter 4 are incorporated with a small-volume liquid-collecting cup 'C' such as coffee cup and tea cup, it is convenient for the user to directly take the small-volume liquid-collecting cup 'C' for drinking use the primary liquid SW.

In eighth step, in the application of using the filter 4 provided with the hangers 41 which are pre-combined with the elastic fixing ring 3, the filter 4 can be completely removed from the outside of the filtration stand 2 by slightly pulling down the elastic fixing ring 3 to pass through the positioning convex points 221 of the circumferentially-arranged folded-type bars 22 of the filtration stand 2 so that the front and rear sides of the filtration stand 2 and the filter 4 (including the elastic fixing ring 3) can be conveniently cleaned by water, and the extraction device can be equally assembled by recombining these components according to the above disclosures. Alternatively, after removing the elastic fixing ring 3 from the top of the filter 4, the filtration stand 2, the filter 4 and the elastic fixing ring 3 can be conveniently cleaned by water. It is environmentally protective and cost-effective to reuse the filter 4 after this cleaning process (as shown in FIGS. 1 and 5).

In ninth step, in the application of using the filter 4 without hangers 41, the filter 4 can be completely removed from the outside of the filtration stand 2 by slightly pulling down or up the elastic fixing ring 3 to pass through the positioning convex points 221 of the circumferentially-arranged folded-type bars 22 of the filtration stand 2 or the circular opening frame 21 of the filtration stand 2 so that the filtration stand 2, the filter 4 and the elastic fixing ring 3 can be conveniently cleaned by water, and the extraction device can be equally assembled by recombining these components according to the above disclosures. If the elastic fixing ring 3 is a squeeze-type fixing ring, the elastic fixing ring 3 can be removed from the filtration stand 2 by slightly squeezing the pinching portions 32 to expand the elastic ring opening thereof, thus to downwardly remove the filter 4 from the filtration stand 2 for performing the cleaning process (as shown in FIGS. 1 and 5).

In tenth step, in the application of using the disposable-type filter 4 without hangers 41, the filter 4 can be completely removed from the outside of the filtration stand 2 by slightly pulling down or up the elastic fixing ring 3 to pass through the positioning convex points 221 of the circumferentially-arranged folded-type bars 22 of the filtration stand 2 or the circular opening frame 21 of the filtration stand 2 so that the filtration stand 2 and the elastic fixing ring 3 can be conveniently cleaned by water, and the extraction device can be equally assembled by recombining these components according to the above disclosures. Note that the removed filter 4 can be directly discarded or dried up for reproducing into a deodorant bag. If the elastic fixing ring 3 is a squeeze-type fixing ring, the elastic fixing ring 3 can be removed from the filtration stand 2 by slightly squeezing the pinching portions 32 to expand the elastic ring opening thereof, thus to downwardly remove the filter 4 from the filtration stand 2 for discarding (as shown in FIG. 2.-A).

In conclusion, it is environmentally protective and cost-effective to provide the extraction device of the present invention to extract the immersion beverage primary liquid from different food materials such as coffee, tea leaves or petals of flower tea, with excellent convenience, hygiene, portability and operability.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An extraction device for an immersion beverage primary liquid, mainly comprising:
   a filtration stand comprising an upper section disposed with a circular opening frame and a lower section disposed with a plurality of folded-type bars separately mounted to the circular opening frame to form a cup-shaped frame with a hollowed circumferential surface and a hollowed bottom surface, the filtration stand being vertically downwardly entered and engaged in or being upwardly rejected from a liquid-collecting cup, wherein a plurality of outwardly-faced positioning convex points being arranged at same horizontal level are respectively provided on top sections of the circumferentially-arranged folded-type bars;
   an elastic fixing ring being formed of non-closed-ended type, comprising a ring body formed with an elastic ring opening and capable of being bottom-up fitted to and elastically engaged and fastened outside a top section of the filtration stand, so that, when extending the elastic fixing ring to upwardly pass through the positioning convex points of the circumferentially-arranged folded-type bars located at the top section of the filtration stand, the elastic fixing ring can be elastically rebounded to position above the positioning convex points of the circumferentially-arranged folded-type bars to stop the elastic fixing ring from being downwardly slid; and
   a filter made of a thin material provided with high-density meshes and shaped as a cup type formed by cutting and sewing or folding to be configured to adaptively engage outside the filtration stand in loose-fit, comprising a top section outwardly clamped by the elastic fixing ring to be positioned and clamped outside the filtration stand;
   characterized in that a cup-shaped filter stand formed herewith is capable of vertically being downwardly engaged in the liquid-collecting cup, installing food material such as coffee powder or tea leaves therein and receiving an adequate hot water to be received in the liquid-collecting cup, and the filtration stand is lifted to be positioned or stayed at or above a cup opening of the liquid-collecting cup, so that an extracted primary liquid passing through the filtration stand and the filter is directly dripped into the liquid-collecting cup for rapid filtration and concentration and a separated and filtered residue is collected in the filter.

2. The extraction device for the immersion beverage primary liquid as claimed in claim 1, wherein the filtration stand further comprises a handle outwardly extended from one side of the circular opening frame disposed on the upper section thereof.

3. The extraction device for the immersion beverage primary liquid as claimed in claim 2, wherein the handle of the filtration stand comprises an external section disposed with a downward-bent holding portion, the holding portion includes a bottom end having a lowest position which is not to exceed a lowest position of the filtration stand and is capable of directly riding above a side grip portion of the liquid-collecting cup, incorporated with a side surface of a bottom section of the cup-shaped filter stand riding on the cup opening of the liquid-collecting cup to form a positioning arrangement therebetween.

4. The extraction device for the immersion beverage primary liquid as claimed in claim 3, wherein the bottom end of the holding portion of the handle of the filtration stand is disposed with an inwardly-bent concave hanging opening which has a downwardly-faced distal end and an opening size slightly greater than a thickness of a cup wall of the cup opening of the liquid-collecting cup, so that the hanging opening of the filtration stand is capable of hanging on a rim of the cup opening of the liquid-collecting cup and the side surface of the bottom section of the cup-shaped filter stand rides on the cup opening of the liquid-collecting cup to form the positioning arrangement therebetween.

5. The extraction device for the immersion beverage primary liquid as claimed in claim 1, wherein one segment of the ring body of the elastic fixing ring is provided with a shank portion which is configured with a outwardly-detoured and backwardly-turned profile, so that a user can hold the shank portion to move the elastic fixing ring outside the filtration stand to be upwardly engaged or downwardly rejected.

6. The extraction device for the immersion beverage primary liquid as claimed in claim 1, wherein the ring body of the elastic fixing ring comprises two distal segments which are capable of being formed with extended segments and locally overlapped and being bent as pinching portions, and a user's two fingers can squeeze the pinching portions of the elastic fixing ring to expand the elastic ring opening thereof so that the elastic fixing ring can be moved outside the filtration stand to be upwardly engaged or downwardly rejected.

7. The extraction device for the immersion beverage primary liquid as claimed in claim 1, wherein partial segments of a top side of a port of the filter are provided with two or more segmental external hangers by machine sewing after being bent, each of the hangers has an inside hanging hole for continuous penetration of ring segments of the elastic fixing ring to form the top section of the filter circumferentially penetrated and engaged with the elastic fixing ring so that the filter and the elastic fixing ring can be integrally combined in advance, and an user can directly hold the elastic fixing ring integrally combined with the filter to be engaged in the filtration stand.

* * * * *